United States Patent
Chae et al.

(10) Patent No.: US 10,797,309 B2
(45) Date of Patent: Oct. 6, 2020

(54) NEGATIVE ELECTRODE ACTIVE MATERIAL AND LITHIUM SECONDARY BATTERY COMPRISING THE SAME

(71) Applicant: LG CHEM, LTD., Seoul (KR)

(72) Inventors: Oh Byong Chae, Daejeon (KR); Su Min Lee, Daejeon (KR); Eun Kyung Kim, Daejeon (KR); Sun Young Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 101 days.

(21) Appl. No.: 15/737,953

(22) PCT Filed: Nov. 11, 2016

(86) PCT No.: PCT/KR2016/013014
§ 371 (c)(1),
(2) Date: Dec. 19, 2017

(87) PCT Pub. No.: WO2017/082680
PCT Pub. Date: May 18, 2017

(65) Prior Publication Data
US 2018/0175376 A1   Jun. 21, 2018

(30) Foreign Application Priority Data

Nov. 11, 2015  (KR) .................. 10-2015-0158421
Nov. 9, 2016   (KR) .................. 10-2016-0148664

(51) Int. Cl.
| | | |
|---|---|---|
| *H01M 4/36* | (2006.01) | |
| *H01M 4/133* | (2010.01) | |
| *H01M 4/13* | (2010.01) | |
| *H01M 4/134* | (2010.01) | |
| *H01M 4/48* | (2010.01) | |
| *H01M 4/52* | (2010.01) | |
| *H01M 4/62* | (2006.01) | |
| *H01M 4/38* | (2006.01) | |
| *H01M 4/587* | (2010.01) | |
| *H01M 4/485* | (2010.01) | |
| *H01M 4/583* | (2010.01) | |
| *H01M 10/0525* | (2010.01) | |
| *H01M 4/02* | (2006.01) | |

(52) U.S. Cl.
CPC ............ *H01M 4/364* (2013.01); *H01M 4/13* (2013.01); *H01M 4/133* (2013.01); *H01M 4/134* (2013.01); *H01M 4/386* (2013.01); *H01M 4/387* (2013.01); *H01M 4/483* (2013.01); *H01M 4/485* (2013.01); *H01M 4/523* (2013.01); *H01M 4/583* (2013.01); *H01M 4/587* (2013.01); *H01M 4/622* (2013.01); *H01M 4/366* (2013.01); *H01M 4/62* (2013.01); *H01M 4/625* (2013.01); *H01M 10/0525* (2013.01); *H01M 2004/021* (2013.01); *H01M 2004/027* (2013.01); *H01M 2220/30* (2013.01)

(58) Field of Classification Search
CPC ....... H01M 4/133; H01M 4/364; H01M 4/583
USPC ............................................ 429/209
See application file for complete search history.

(56) References Cited

U.S. PATENT DOCUMENTS

| | | | | |
|---|---|---|---|---|
| 5,919,589 | A * | 7/1999 | Kawakami | C04B 35/536 29/623.1 |
| 2004/0023115 | A1* | 2/2004 | Kato | H01M 2/0285 429/231.8 |
| 2006/0151318 | A1 | 7/2006 | Park et al. | |
| 2009/0074957 | A1 | 3/2009 | Park et al. | |
| 2011/0014518 | A1* | 1/2011 | Nakai | H01M 4/366 429/207 |
| 2013/0122369 | A1 | 5/2013 | Kim et al. | |
| 2013/0260233 | A1* | 10/2013 | Hsiao | H01M 4/131 429/211 |
| 2014/0045056 | A1* | 2/2014 | Yamami | H01M 10/0561 429/199 |
| 2015/0270534 | A1* | 9/2015 | Nozato | H01M 4/133 429/217 |

FOREIGN PATENT DOCUMENTS

| | | |
|---|---|---|
| EP | 2 450 988 A1 | 5/2012 |
| JP | 5524202 B2 | 6/2014 |

(Continued)

OTHER PUBLICATIONS

International Search Report for PCT/KR2016/013014 dated Feb. 16, 2017.

*Primary Examiner* — James M Erwin
(74) *Attorney, Agent, or Firm* — Birch, Stewart, Kolasch & Birch, LLP

(57) ABSTRACT

The present invention relates to a negative electrode active material comprising a mixture of a first negative electrode active material and a second negative electrode active material, wherein the first negative electrode active material has a hardness of 1 kg/mm$^2$ to 10 kg/mm$^2$ on the basis of the Vickers hardness standard, and the second negative electrode active material has a higher hardness than the first negative electrode active material. The negative electrode active material according to the present invention comprises a mixture of negative electrode active materials having different hardness so that pores of an active material layer are maintained in spite of a rolling process at the time of producing an negative electrode, and the pores acting as an electrolyte flow passage of an electrode can effectively be secured, thereby producing a lithium secondary battery having excellent battery performance by lowering resistance when a battery is charged or discharged.

12 Claims, No Drawings

(56) References Cited

FOREIGN PATENT DOCUMENTS

| JP | 5682411 B2 | 3/2015 |
| JP | 5802513 B2 | 10/2015 |
| KR | 10-2006-0082190 A | 7/2006 |
| KR | 10-2012-0017193 A | 2/2012 |
| KR | 10-2013-0052397 A | 5/2013 |

\* cited by examiner

NEGATIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2015-0158421, filed on Nov. 11, 2015, and Korean Patent Application No. 10-2016-0148664, filed on Nov. 9, 2016, the disclosures of which are incorporated herein by reference in their entirety.

TECHNICAL FIELD

The present invention relates to a negative electrode active material and a lithium secondary battery including the same, and particularly, to a negative electrode active material capable of effectively ensuring a pore which acts as an electrolyte solution flow passage of an electrode by including a mixture of negative electrode active materials having different hardnesses, and a lithium secondary battery including the same.

BACKGROUND ART

As technology development and demand for mobile devices increase, demand for a secondary battery as an energy source is rapidly increasing, and among such secondary batteries, a lithium secondary battery which exhibits high energy density and operating potential, a long cycle lifespan, and a low self-discharge rate has been commercialized and widely used.

As a negative electrode of a conventional secondary battery, lithium metal has been used. However, as a short circuit in a battery caused by formation of a dendrite and a risk of explosion caused thereby are known, it has been replaced with a carbon-based compound which maintains structural and electrical properties and is capable of reversible intercalation and deintercalation of lithium ions.

The carbon-based compound has a very low discharge potential of about −3 V with respect to the standard hydrogen electrode potential, and exhibits excellent electrode lifespan characteristics (cycle lifespan) due to very reversible charging and discharging behaviors caused by unidirectional orientation of a graphene layer. Also, since electrode potential upon charging with Li ions may be 0 V Li/Li$^+$, which is almost similar to that of pure lithium metal, when the carbon-based compound is used for forming an oxide-based positive electrode and a battery, higher energy may be obtained.

A negative electrode for a secondary battery using the carbon-based compound is commonly manufactured by mixing a carbon-based compound as a negative electrode active material, if necessary, with a conductive material and a binder to prepare a negative electrode active material slurry, and then applying the slurry on an electrode current collector such as a copper foil or the like, followed by drying. In the application of the slurry, a rolling (pressing) process is performed to compress active material powder onto a current collector and uniformize a thickness of an electrode.

In this case, as active material powder is pressed in the rolling process, a space between active materials is reduced, and thus a pore is decreased. As the pore is decreased, an electrolyte solution does not easily penetrate, which causes high resistance upon charging and discharging.

In particular, such a phenomenon is worsened as a thickness of an electrode is thicker, and since the inside of an electrode is not easily impregnated with an electrolyte solution, an ion flow passage cannot be ensured, and thus ions may not smoothly migrate, which results in a degradation of battery performance and lifespan characteristics.

Therefore, it is necessary to develop technology for ensuring a pore of a negative electrode active material layer despite the rolling process in the manufacture of a negative electrode.

DISCLOSURE

Technical Problem

It is an aspect of the present invention to provide a novel negative electrode active material capable of ensuring a pore of a negative electrode active material layer despite a rolling process in the manufacture of a negative electrode of a lithium secondary battery.

It is another aspect of the present invention to provide a negative electrode including the negative electrode active material and a lithium secondary battery including the same.

Technical Solution

According to one embodiment of the present invention, there is provided a negative electrode active material which includes a mixture of a first negative electrode active material and a second negative electrode active material, wherein the first negative electrode active material has a hardness of 1 to 10 kg/mm$^2$ based on Vickers hardness, and the second negative electrode active material has a higher hardness than that of the first negative electrode active material.

In addition, according to one embodiment of the present invention, there is provided a negative electrode including the negative electrode active material and a lithium secondary battery including the same.

Advantageous Effects

A negative electrode active material according to the present invention includes a mixture of a first negative electrode active material and a second negative electrode active material having different hardnesses so that a pore of an active material layer can be maintained despite a rolling process in the manufacture of a negative electrode, and thus the pore which acts as an electrolyte solution flow passage of an electrode can be effectively ensured. Therefore, a lithium secondary battery whose performance is excellent can be manufactured by decreasing resistance upon charging and discharging of the battery.

MODES OF THE INVENTION

Hereinafter, the present invention will be described in more detail for promoting understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

A negative electrode active material according to the present invention includes a mixture of a first negative electrode active material and a second negative electrode active material, wherein the second negative electrode active material has a higher hardness than that of the first negative electrode active material.

The negative electrode active material according to the present invention includes the second negative electrode active material having a higher hardness than that of the first negative electrode active material so that, when being compressed onto a current collector through a rolling process upon the manufacture of a negative electrode, a shape of the second negative electrode active material having a relatively higher hardness may be maintained as much as possible to prevent a decrease in a size of a pore in a negative electrode active material layer caused by excessively pressing negative electrode active materials included in a negative electrode active material layer.

The first negative electrode active material may have a hardness of 1 to 10 $kg/mm^2$ based on Vickers hardness, particularly, 2 to 9 $kg/mm^2$, and more particularly, 5 to 8 $kg/mm^2$.

The second negative electrode active material has a higher hardness than that of the first negative electrode active material, and a hardness of the second negative electrode active material may be 11 to 10,000 $kg/mm^2$, particularly, 20 to 7,000 $kg/mm^2$, and more particularly, 100 to 5,000 $kg/mm^2$ based on Vickers hardness.

The first negative electrode active material and the second negative electrode active material may be mixed in a weight ratio of 99:1 to 50:50, particularly, 95:5 to 60:40, and more particularly, 90:10 to 70:30.

When the first negative electrode active material and the second negative electrode active material are mixed in a weight ratio of 99:1 to 50:50, a pore of a negative electrode active material layer may be more appropriately maintained when the active material is compressed onto a current collector through a rolling process upon the manufacture of a negative electrode, and properties of the first negative electrode active material as an active material may be appropriately exhibited and maintained.

The first negative electrode active material is commonly a material which can occlude and emit lithium ions, and may be an active material having a relatively low hardness compared to the second negative electrode active material. For example, the first negative electrode active material may be one or more selected from the group consisting of soft carbon, hard carbon, natural graphite, kish graphite, pyrolytic carbon, mesophase pitch-based carbon fiber, mesocarbon microbeads, mesophase pitches, petroleum or coal tar pitch-derived cokes, Al, Zn, Sb, Si, Ge and Sn, and particularly, may be natural graphite.

The second negative electrode active material is commonly a material which can occlude and emit lithium ions, and may be an active material having a relatively high hardness compared to the first negative electrode active material. For example, the second negative electrode active material may be one or more selected from the group consisting of artificial graphite, a metal carbide, an alloy, a metal oxide and a metal coated with a metal oxide.

In an example of the present invention, when the second negative electrode active material is artificial graphite, an alloy or a metal carbide, the second negative electrode active material may be used as is, or may also be used, if necessary, by further forming a metal oxide coating layer on a surface thereof. That is, the second negative electrode active material may be a material in which a metal oxide coating layer is formed on the surface of artificial graphite, an alloy or a metal carbide. In this case, the hardness of the active material may be more increased.

The metal oxide coating layer formed on the surface of the second negative electrode active material may be formed by a method such as drop coating, chemical vapor deposition, melt coating, electrodynamic coating, electrospraying, electrospinning, dip coating or the like.

The coating layer may have a thickness of 1 nm to 100 μm, particularly, 5 nm to 10 μm, and more particularly, 10 nm to 1 μm.

The metal may be one or more selected from the group consisting of Si, Ge, Sn, Al, Zn, and Sb, and the alloy may be two or more alloys selected from the group consisting of Si, Ge, Sn, Al, Zn, and Sb.

The metal carbide may be one or more selected from the group consisting of titanium carbide, aluminum carbide, chromium carbide, zinc carbide, copper carbide, magnesium carbide, zirconium carbide, molybdenum carbide, vanadium carbide, niobium carbide, iron carbide, manganese carbide, cobalt carbide, nickel carbide and tantalum carbide.

The metal oxide is not particularly limited as long as it is a metal oxide, and may be a transition metal oxide used as a negative electrode active material of a lithium secondary battery.

The metal oxide may be, for example, one or more selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, iron oxide, manganese oxide, vanadium oxide, cobalt oxide, nickel oxide and tantalum pentoxide, and particularly, may be one or more selected from the group consisting of titanium oxide, iron oxide, cobalt oxide and nickel oxide.

The second negative electrode active material, when a pressure of 2,000 $kgf/cm^2$ is applied, has a particle size in a direction in which the pressure is applied of 60% or more, particularly, 70 to 95%, and more particularly, 80 to 90% based on an original particle size.

The first negative electrode active material may have an average particle size ($D_{50}$) of 10 nm to 100 μm, particularly, 100 nm to 50 μm, and more particularly, 1 μm to 30 μm.

When the first negative electrode active material has an average particle size of 10 nm to 100 μm, it is possible to have appropriate capacity per volume by preventing a decrease in electrode density, and a slurry thereof for forming an electrode can be appropriately applied with a uniform thickness.

The second negative electrode active material may have an average particle size ($D_{50}$) of 10 nm to 100 μm, particularly, 100 nm to 50 μm, and more particularly, 1 μm to 30 μm.

When the second negative electrode active material has an average particle size of 10 nm to 100 μm, it is possible for the second negative electrode active material to block a decrease in the size of a pore of the negative electrode active material layer caused by pressing the first active material in a rolling process, have appropriate capacity per volume according to appropriate electrode density, and a slurry thereof for forming an electrode can be appropriately applied with a uniform thickness.

The second negative electrode active material may have a slightly larger particle size compared to the first negative electrode active material so that a pore of the negative electrode active material layer may be appropriately maintained when being compressed onto a current collector through a rolling process upon the manufacture of a negative electrode, and a particle size ratio of the first negative electrode active material and the second negative electrode active material may be 1:1.1 to 1:5, particularly, 1:1.1 to 1:2, and more particularly, 1:1.2 to 1:2.

In the present invention, the average particle size ($D_{50}$) of the first negative electrode active material and the second negative electrode active material can be defined as a particle size corresponding to 50% in the particle size distribution. The average particle size may be measured, for example, by using a laser diffraction method or a scanning electron microscope (SEM) image, but the present invention is not limited thereto. Through the laser diffraction method, a particle size ranging from a submicron region to several mm may be generally measured, and a result having high reproducibility and high resolvability may be obtained.

In addition, the present invention provides a negative electrode which includes a negative electrode active material layer including the negative electrode active material.

The negative electrode may be manufactured by mixing the negative electrode active material with a solvent, if necessary, a binder and a conductive material, stirring the mixture to prepare a slurry, and then applying the slurry on a current collector, compressing and drying the applied slurry to form a negative electrode active material layer on the current collector.

The negative electrode active material layer may have a porosity of 10 to 60%, particularly, 20 to 40%, and more particularly, 25 to 35%.

The negative electrode current collector may be generally prepared with a thickness of 3 to 500 μm. Such a negative electrode current collector is not particularly limited as long as it does not cause a chemical change in the battery and has conductivity. For example, the negative electrode current collector may be copper, stainless steel, aluminum, nickel, titanium, calcined carbon, or copper or stainless steel whose surface is treated with carbon, nickel, titanium, silver or the like, an aluminum-cadmium alloy or the like. Also, like a positive electrode current collector, the negative electrode current collector may have fine irregularities at a surface thereof to increase adhesion of the negative electrode active material. In addition, the negative electrode current collector may be used in any of various forms such as a film, a sheet, a foil, a net, a porous material, a foam, a non-woven fabric and the like.

The binder and the conductive material used in the negative electrode may be any one that can be commonly used in the art.

The solvent for forming the negative electrode may be an organic solvent such as N-methyl pyrrolidone (NMP), dimethylformamide (DMF), acetone, dimethylacetamide or the like, water, or the like, and these solvents may be used alone or in combination of two or more. The solvent is used in an amount just enough to dissolve and disperse the negative electrode active material, the binder and the conductive material in consideration of a thickness of an applied slurry and manufacturing yield.

As the binder, any of various types of binders such as a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starches, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, styrene-butadiene rubber (SBR), fluororubber, polyacrylic acid, a polymer in which hydrogen atoms of the above polymers are substituted with Li, Na, Ca or the like, various copolymers and the like may be used.

The conductive material is not particularly limited as long as it does not cause a chemical change in the battery and has conductivity. For example, the conductive material may be graphite such as natural graphite, artificial graphite or the like; carbon black such as acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like.

According to an embodiment of the present invention, the negative electrode may further include a thickening agent to adjust viscosity. The thickening agent may be a cellulose-based compound, for example, one or more selected from the group consisting of carboxymethyl cellulose (CMC), hydroxymethyl cellulose, hydroxyethyl cellulose and hydroxypropyl cellulose, and particularly, may be CMC. Also, the thickening agent may be applied to a negative electrode after dispersing the thickening agent together with the negative electrode active material and the binder in water.

In addition, the present invention provides a lithium secondary battery including the negative electrode.

The lithium secondary battery may include a positive electrode, a negative electrode, a separator interposed between the positive electrode and the negative electrode.

The positive electrode may be manufactured by a common method known in the art. For example, the positive electrode may be manufactured by mixing a positive electrode active material with a solvent, if necessary, a binder, a conductive material and a dispersant, stirring the mixture to prepare a slurry, and then applying the slurry on a current collector made of a metal, followed by compression and drying.

The current collector made of a metal is a metal which has high conductivity and to which the positive electrode active material slurry may be easily adhered, and is not particularly limited as long as it does not cause a chemical change in the battery within a voltage range of the battery and has high conductivity. For example, the current collector may be stainless steel, aluminum, nickel, titanium, calcined carbon, or aluminum or stainless steel whose surface is treated with carbon, nickel, titanium, silver, or the like. Also, the current collector may have fine irregularities at a surface thereof to increase adhesion of the positive electrode active material. In addition, the current collector may be used in any of various forms such as a film, a sheet, a foil, a net, a porous material, a foam, a non-woven fabric and the like, and may have a thickness of 3 to 500 μm.

In a method of manufacturing the lithium secondary battery according to the present invention, the positive electrode active material may be, for example, a lithium cobalt oxide ($LiCoO_2$); a lithium nickel oxide ($LiNiO_2$); $Li[Ni_aCo_bMn_cM^1{}_d]O_2$ (here, $M^1$ is any one or two or more elements selected from the group consisting of Al, Ga and In, $0.3 \le a \le 1.0$, $0 \le b \le 0.5$, $0 \le c \le 0.5$, $0 \le d \le 0.1$, and $a+b+c+d=1$); a layered compound such as $Li(Li_eM^2{}_{f-e-f}M^3{}_f)O_{2-g}A_g$ (here, $0 \le e \le 0.2$, $0.6 \le f \le 1$, $0 \le f \le 0.2$, $0 \le g \le 0.2$, $M^2$ is Mn, and one or more selected from the group consisting of Ni, Co, Fe, Cr, V, Cu, Zn and Ti, $M^3$ is one or more selected from the group consisting of Al, Mg and B, and A is one or more selected from the group consisting of P, F, S and N) or the like, or a compound substituted with one or more transition metals; a lithium manganese oxide such as $Li_{1+h}Mn_{2-h}O_4$ (here, $0 \le h \le 0.33$), $LiMnO_3$, $Li_2Mn_2O_3$, $LiMnO_2$ or the like; a lithium copper oxide ($Li_2CuO_2$); a vanadium oxide such as $LiV_3O_8$, $V_2O_5$, $Cu_2V_2O_7$ or the like; a Ni site-type lithium nickel oxide represented by $LiNi_{1-i}M^4{}_iO_2$ (here, $M^4$ is Co, Mn, Al, Cu, Fe, Mg, B or Ga, and $0.01 \leq y \leq 0.3$); a lithium manganese composite oxide represented by $LiMn_{2-y}M^5_yO_2$ (here, $M^5$ is Co, Ni, Fe, Cr, Zn or Ta, and $0.01 \leq y \leq 0.1$) or $Li_2Mn_3M^6O_8$ (here, $M^6$ is Fe, Co, Ni, Cu or Zn); $LiMn_2O_4$ in which some Li ions in the chemical formulas are substituted with alkaline earth metal ions; a disulfide compound; or $LiFe_3O_4$, $Fe_2(MoO_4)_3$, but the present invention is not limited thereto.

The solvent for forming the positive electrode may be an organic solvent such as N-methyl pyrrolidone (NMP), dimethylformamide (DMF), acetone, dimethylacetamide or the like, water or the like, and these solvents may be used alone or in combination of two or more. The solvent is used in an amount just enough to dissolve and disperse the positive electrode active material, the binder and the conductive material in consideration of a thickness of an applied slurry and manufacturing yield.

As the binder, any of various types of binders such as a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starches, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, styrene-butadiene rubber (SBR), fluoro rubber, polyacrylic acid, a polymer in which hydrogen atoms of the above polymers are substituted with Li, Na, Ca or the like, various copolymers and the like may be used.

The conductive material is not particularly limited as long as it does not cause a chemical change in the battery and has conductivity. For example, the conductive material may be graphite such as natural graphite, artificial graphite or the like; carbon black such as acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like.

The dispersant may be an aqueous dispersant or an organic dispersant such as N-methyl-2-pyrrolidone or the like.

Meanwhile, the separator may be a common porous polymer film conventionally used as a separator, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof. Alternatively, the separator may be a common porous non-woven fabric, for example, a non-woven fabric made of glass fiber with a high melting point, polyethylene terephthalate fiber or the like, but the present invention is not limited thereto.

A lithium salt that may be included as an electrolyte used in the present invention may be any one commonly used as an electrolyte for a lithium secondary battery without limitation. For example, the lithium salt may include, as an anion, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present invention may be an organic liquid electrolyte, an inorganic liquid electrolyte, a solid polymer electrolyte, a gel polymer electrolyte, an inorganic solid electrolyte, a molten-type inorganic electrolyte or the like, which can be used in the manufacture of a lithium secondary battery, but the present invention is not limited thereto.

The appearance of the lithium secondary battery according to the present invention is not particularly limited, but it may be a cylindrical form using a can, a prismatic form, a pouch form, a coin form or the like.

The lithium secondary battery according to the present invention is preferably used in a battery cell used as a power source for small sized devices, and also used as a unit cell of a medium to large sized battery module including a plurality of battery cells.

EXAMPLES

Hereinafter, examples and experimental examples will be described in detail for promoting an understanding of the present invention. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Example 1

96.3 wt % of a negative electrode active material prepared by mixing natural graphite (a particle size of 20 μm and a hardness of 7 $kg/mm^2$) as a first active material and titanium oxide (a particle size of 10 μm and a hardness of 700 $kg/mm^2$) as a second active material in a weight ratio of 50:50, 1.0 wt % of Super-P as a conductive material, and a mixture of 1.5 wt % of SBR and 1.2 wt % of CMC as a binder were added to NMP as a solvent to prepare a negative electrode active material slurry. The prepared negative electrode active material slurry was applied on one surface of a copper current collector so as to have a thickness of 65 μm in such a way that a loading amount is as listed in Table 1 below to form an active material layer. The active material layer was dried, and then rolled so as to have a porosity of the active material layer of 30%. Afterward, the resulting material was punched to a predetermined size to manufacture a negative electrode.

Example 2

A negative electrode was manufactured in the same manner as in Example 1 except that an active material layer was rolled so as to have a porosity of the active material layer of 25%.

Example 3

A negative electrode was manufactured in the same manner as in Example 1 except that an active material layer was rolled so as to have a porosity of the active material layer of 20%.

Example 4

A negative electrode was manufactured in the same manner as in Example 1 except that a negative electrode active material prepared by mixing natural graphite as a first active material and titanium oxide as a second active material in a weight ratio of 70:30 was used in such a way that a loading amount is as listed in Table 1 below.

Example 5

A negative electrode was manufactured in the same manner as in Example 4 except that an active material layer was rolled so as to have a porosity of the active material layer of 25%.

Example 6

A negative electrode was manufactured in the same manner as in Example 4 except that an active material layer was rolled so as to have a porosity of the active material layer of 20%.

Example 7

96.3 wt % of a negative electrode active material prepared by mixing Sn (a particle size of 20 μm and a hardness of 7 kg/mm$^2$) as a first active material and 1 wt % iron oxide (Fe$_2$O$_3$)-coated Sn (a particle size of 10 μm and a hardness of 100 kg/mm$^2$) as a second active material in a weight ratio of 50:50, 1.0 wt % of Super-P as a conductive material, and a mixture of 1.5 wt % of SBR and 1.2 wt % of CMC as a binder were added to NMP as a solvent to prepare a negative electrode active material slurry. The prepared negative electrode active material slurry was applied on one surface of a copper current collector in such a way that a loading amount is as listed in Table 1 below to form an active material layer. The active material layer was dried, and then rolled so as to have a porosity of the active material layer of 30%. Afterward, the resulting material was punched to a predetermined size to manufacture a negative electrode.

Example 8

A negative electrode was manufactured in the same manner as in Example 7 except that 5 wt % iron oxide-coated Sn (a particle size of 10 μm and a hardness of 500 kg/mm$^2$) was used as a second active material in such a way that a loading amount is as listed in Table 1 below.

Example 9

96.3 wt % of a negative electrode active material prepared by mixing natural graphite (a particle size of 20 μm and a hardness of 7 kg/mm$^2$) as a first active material and artificial graphite (a particle size of 10 μm and a hardness of 13 kg/mm$^2$) as a second active material in a weight ratio of 50:50, 1.0 wt % of Super-P as a conductive material, and a mixture of 1.5 wt % of SBR and 1.2 wt % of CMC as a binder were added to NMP as a solvent to prepare a negative electrode active material slurry. The prepared negative electrode active material slurry was applied on one surface of a copper current collector in such a way that a loading amount is as listed in Table 1 below to form an active material layer. The active material layer was dried, and then rolled so as to have a porosity of the active material layer of 30%. Afterward, the resulting material was punched to a predetermined size to manufacture a negative electrode.

Example 10

A negative electrode was manufactured in the same manner as in Example 9 except that an active material layer was rolled so as to have a porosity of the active material layer of 25%.

Example 11

A negative electrode was manufactured in the same manner as in Example 9 except that an active material layer was rolled so as to have a porosity of the active material layer of 20%.

Comparative Example 1

96.3 wt % of natural graphite (a particle size of 20 μm and a hardness of 7 kg/mm$^2$) as a negative electrode active material, 1.0 wt % of Super-P as a conductive material, and a mixture of 1.5 wt % of SBR and 1.2 wt % of CMC as a binder were added to NMP as a solvent to prepare a negative electrode active material slurry.

The prepared negative electrode active material slurry was applied on one surface of a copper current collector in such a way that a loading amount is as listed in Table 1 below to form an active material layer. The active material layer was dried, and then rolled so as to have a porosity of the active material layer of 30%. Afterward, the resulting material was punched to a predetermined size to manufacture a negative electrode.

Comparative Example 2

A negative electrode was manufactured in the same manner as in Comparative Example 1 except that an active material layer was rolled so as to have a porosity of the active material layer of 25%.

Comparative Example 3

A negative electrode was manufactured in the same manner as in Comparative Example 1 except that an active material layer was rolled so as to have a porosity of the active material layer of 20%.

The hardness in examples and comparative examples is based on Vickers hardness.

Examples 1-1 to 9-1: Manufacture of Lithium Secondary Battery

Lithium metal was used as a counter electrode, a polyolefin separator was interposed between each negative electrode according to Examples 1 to 9 and the lithium metal, and then an electrolyte in which 1 M LiPF$_6$ was dissolved in a solvent prepared by mixing ethylene carbonate (EC) and diethyl carbonate (DEC) at a volume ratio of 30:70 was injected to manufacture a coin-type half cell.

Comparative Examples 1-1 to 3-1: Manufacture of Lithium Secondary Battery

Lithium metal was used as a counter electrode, a polyolefin separator was interposed between each negative electrode according to Comparative Examples 1 to 3 and the lithium metal, and then an electrolyte in which 1 M LiPF$_6$ was dissolved in a solvent prepared by mixing EC and DEC at a volume ratio of 30:70 was injected to manufacture a coin-type half cell.

Experimental Example 1

Titanium oxide (a hardness of 700 kg/mm$^2$) or iron oxide-coated Sn (a hardness of 500 kg/mm$^2$) used as a second active material in Examples 1 to 6, and 8 was pressed at a pressure of 2,000 kgf/cm$^2$ using a roll press, and an average particle size (D$_{50}$) thereof was measured, results of which were compared with an average particle size ($D_{50}$) before the pressure was applied.

As a result, in the case of titanium oxide (a hardness of 700 kg/mm$^2$), an average particle size ($D_{50}$) after a pressure of 2,000 kgf/cm$^2$ was applied was 87% based on an average particle size ($D_{50}$) before the pressure was applied. Also, in the case of iron oxide-coated Sn (a hardness of 500 kg/mm$^2$), an average particle size ($D_{50}$) after a pressure of 2,000 kgf/cm$^2$ was applied was 55% based on an average particle size ($D_{50}$) before the pressure was applied.

Experimental Example 2

Each battery according to Examples 1-1 to 9-1 and Comparative Examples 1-1 to 3-1 was subjected to a charge/discharge test two times under a charge/discharge current density of 0.1 C, a final charge voltage of 4.2 V (Li/Li$^+$) and a final discharge voltage of 3 V (Li/Li$^+$). Subsequently, discharge capacity was measured at a charge current density of 0.1 C and discharge current density of 1 C. Discharge capacity at 1 C with respect to discharge capacity at 0.1 C is shown in Table 1 below.

1-1 to 3-1 were compared, when the degree of rolling the negative electrode active material layer was increased to reduce a porosity of the negative electrode active material layer, Examples 1-1 to 3-1, 4-1 to 6-1 and 9-1 to 11-1, in which active materials having a relatively high hardness were used together, exhibited a slight decrease in discharge capacity at 1 C with respect to discharge capacity at 0.1 C compared to Comparative Examples 1-1 to 3-1, in which only natural graphite was used.

Therefore, it can be confirmed that, when a negative electrode active material layer was formed by mixing a first negative electrode active material having a relatively low hardness and a second negative electrode active material having a relatively high hardness, the second negative electrode active material having a relatively high hardness is capable of appropriately maintaining a pore size of the negative electrode active material layer, and thus a secondary battery using the same may exhibit much higher discharge capacity and excellent rate characteristics.

TABLE 1

| | Negative electrode active material | Loading amount (mg) | Mixing ratio | Porosity (%) | Discharge capacity at 0.1 C (mAh) | Discharge capacity at 1 C (mAh) | Discharge capacity at 1 C with respect to discharge capacity at 0.1 C (%) |
|---|---|---|---|---|---|---|---|
| Example 1-1 | Natural graphite/titanium oxide | 20.2 | 50:50 | 30 | 5.26 | 4.73 | 90 |
| Example 2-1 | Natural graphite/titanium oxide | 20.2 | 50:50 | 25 | 5.26 | 4.52 | 86 |
| Example 3-1 | Natural graphite/titanium oxide | 20.2 | 50:50 | 20 | 5.26 | 4.26 | 81 |
| Example 4-1 | Natural graphite/titanium oxide | 17.6 | 70:30 | 30 | 5.26 | 4.47 | 85 |
| Example 5-1 | Natural graphite/titanium oxide | 17.6 | 70:30 | 25 | 5.26 | 4.31 | 82 |
| Example 6-1 | Natural graphite/titanium oxide | 17.6 | 70:30 | 20 | 5.26 | 4.16 | 79 |
| Example 7-1 | Sn/Fe$_2$O$_3$(1 wt %)-coated Sn | 5.4 | 50:50 | 30 | 5.26 | 4.37 | 83 |
| Example 8-1 | Sn/Fe$_2$O$_3$(5 wt %)-coated Sn | 5.4 | 50:50 | 30 | 5.26 | 4.47 | 85 |
| Example 9-1 | Natural graphite/artificial graphite | 14.8 | 50:50 | 30 | 5.26 | 4.26 | 81 |
| Example 10-1 | Natural graphite/artificial graphite | 14.8 | 50:50 | 25 | 5.26 | 4.00 | 76 |
| Example 11-1 | Natural graphite/artificial graphite | 14.8 | 50:50 | 20 | 5.26 | 3.52 | 67 |
| Comparative Example 1-1 | Natural graphite | 14.8 | — | 30 | 5.26 | 4.10 | 78 |
| Comparative Example 2-1 | Natural graphite | 14.8 | — | 25 | 5.26 | 3.89 | 74 |
| Comparative Example 3-1 | Natural graphite | 14.8 | — | 20 | 5.26 | 3.26 | 62 |

Referring to Table 1, it can be confirmed that, when Examples 1-1, 4-1, 7-1 to 9-1 and Comparative Example 1-1, which exhibited the same porosity of the negative electrode active material layer, were compared, Examples 1-1, 4-1, and 7-1 to 9-1, in which active materials having a relatively high hardness were used together, exhibited high discharge capacity and high discharge capacity at 1 C with respect to discharge capacity at 0.1 C compared to Comparative Example 1-1.

In addition, it can be confirmed that, when Examples 1-1 to 3-1, 4-1 to 6-1, 9-1 to 11-1 and Comparative Examples

The invention claimed is:

1. A negative electrode active material comprising a mixture of a first negative electrode active material and a second negative electrode active material,
   wherein the first negative electrode active material has a hardness of 1 to 10 kg/mm$^2$ based on Vickers hardness, and
   the second negative electrode active material has a higher hardness than that of the first negative electrode active material, wherein the second negative electrode active material is one or more selected from the group consisting of a metal carbide coated with a metal oxide, an alloy coated with a metal oxide, and a metal coated with a metal oxide, and wherein the first negative electrode active material is one or more selected from the group consisting of soft carbon, hard carbon, natural graphite, kish graphite, pyrolytic carbon, mesophase pitch-based carbon fiber, meso-carbon microbeads, mesophase pitches, petroleum or coal tar pitch-derived cokes, Al, Zn, Sb, Si, Ge and Sn.

2. The negative electrode active material of claim 1, wherein the second negative electrode active material has a hardness of 11 to 10,000 kg/mm$^2$ based on Vickers hardness.

3. The negative electrode active material of claim 1, wherein the first negative electrode active material and the second negative electrode active material are included in a weight ratio of 99:1 to 50:50.

4. The negative electrode active material of claim 1, wherein the second negative electrode comprises the metal oxide and/or the metal coated with the metal oxide, wherein the metal oxide is one or more selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, iron oxide, manganese oxide, vanadium oxide, cobalt oxide, nickel oxide and tantalum pentoxide.

5. The negative electrode active material of claim 1, wherein the second negative electrode active material has a particle size in a direction in which the pressure is applied of 60% or more based on an original particle size when a pressure of 2,000 kgf/cm$^2$ is applied.

6. The negative electrode active material of claim 1, wherein the second negative electrode active material has a particle size in a direction in which the pressure is applied of 80 to 90% based on an original particle size when a pressure of 2,000 kgf/cm$^2$ is applied.

7. The negative electrode active material of claim 1, wherein the first negative electrode active material has an average particle size ($D_{50}$) of 10 nm to 100 μm.

8. The negative electrode active material of claim 1, wherein the second negative electrode active material has an average particle size ($D_{50}$) of 10 nm to 100 μm.

9. A negative electrode comprising a negative electrode active material layer including the negative electrode active material according to claim 1.

10. The negative electrode of claim 9, wherein the negative electrode active material layer has a porosity of 10 to 60%.

11. A lithium secondary battery comprising the negative electrode according to claim 9.

12. The negative electrode active material of claim 1, wherein the metal in the metal oxide is one or more selected from the group consisting of Si, Ge, Sn, Al, Zn, and Sb.

* * * * *